United States Patent [19]
Fabry et al.

[11] 3,978,328
[45] Aug. 31, 1976

[54] POCKET CALCULATOR

[75] Inventors: William F. Fabry, Sunnyvale; Dennis C. Hersley, Cupertino, both of Calif.

[73] Assignee: National Semiconductor Corporation, Santa Clara, Calif.

[22] Filed: Apr. 7, 1975

[21] Appl. No.: 565,807

[52] U.S. Cl. .......................... 235/156; 340/172.5; 340/365 R; 178/17 C
[51] Int. Cl.² ........................................ G06F 7/38
[58] Field of Search ................. 235/156, 160, 164; 340/172.5, 365 R; 178/17 C

[56] References Cited
UNITED STATES PATENTS

| | | | |
|---|---|---|---|
| 3,187,321 | 6/1965 | Kameny | 340/365 R |
| 3,560,964 | 2/1971 | Bedell et al. | 340/365 R |
| 3,839,630 | 10/1974 | Olander, Jr. et al. | 235/156 |
| 3,925,779 | 12/1975 | Gerstenhaber | 340/365 R |

*Primary Examiner*—Malcolm A. Morrison
*Assistant Examiner*—Errol A. Krass
*Attorney, Agent, or Firm*—Lowhurst & Aine

[57] ABSTRACT

A pocket calculator includes a main frame which consists of a keyboard, a display and display drivers mounted on a printed circuit board, a case, and a connector for receiving one of a plurality of arithmetic or processor modules. Each processor module includes an arithmetic chip mounted in a package which is, in turn, mounted on a printed circuit board having an edge connector. The case of the calculator has an aperture for receiving each one of the modules. The connector on the printed circuit board of the main frame is mounted in registry with the aperture and is disposed for receiving the module, such that any one of the number of processor modules may be employed with the same calculator main frame.

6 Claims, 6 Drawing Figures

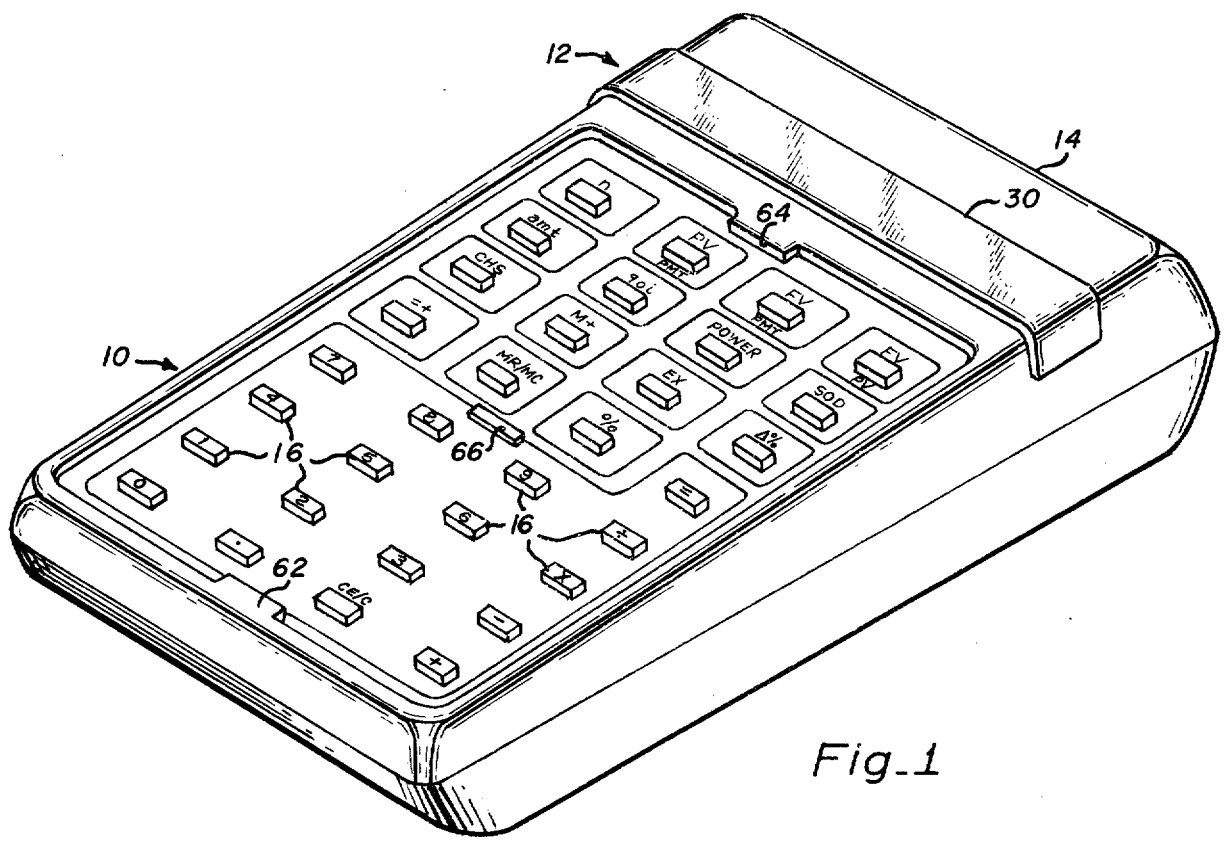
Fig_1
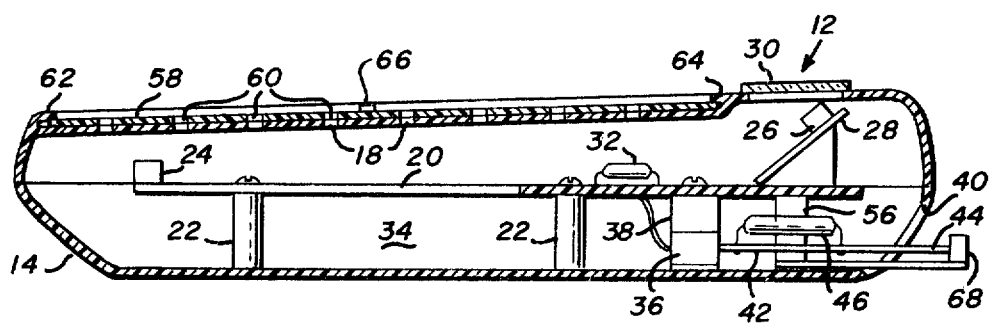
Fig_2

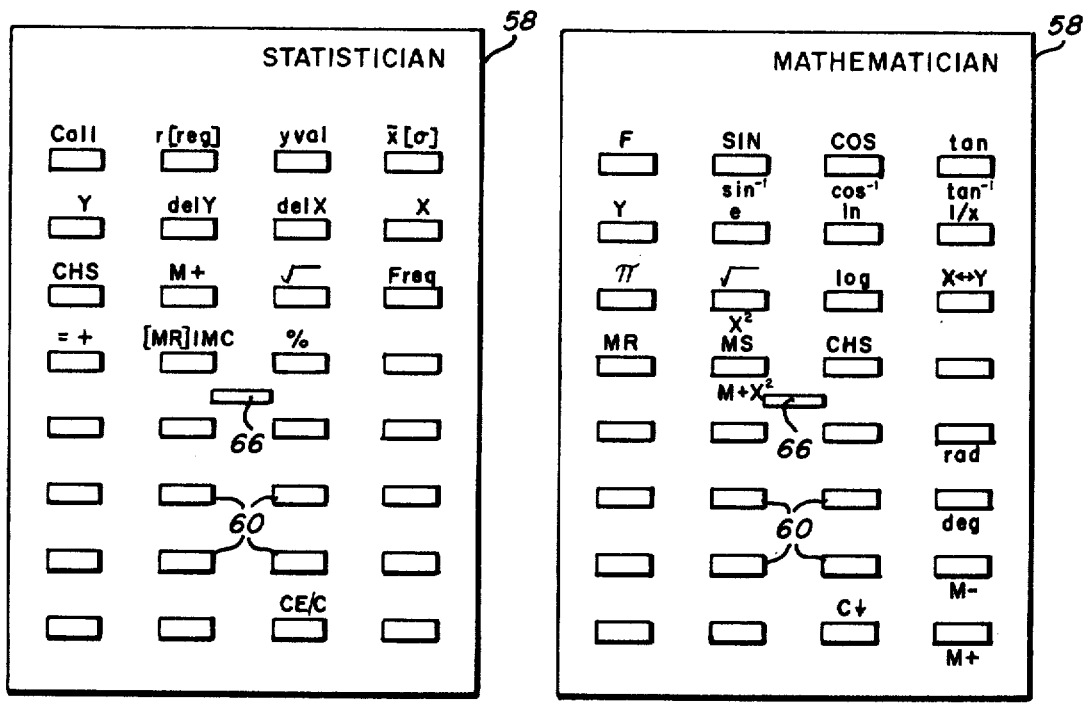
Fig_5        Fig_6
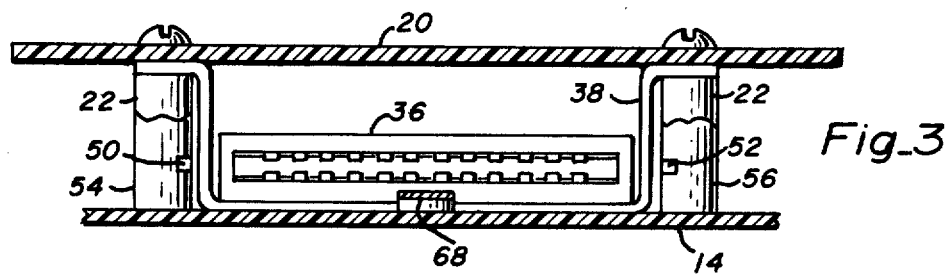
Fig_3
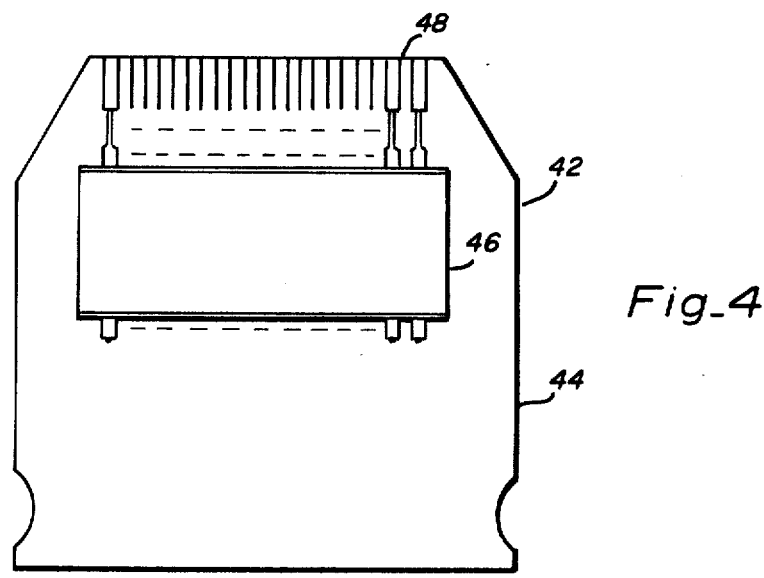
Fig_4

POCKET CALCULATOR

BACKGROUND OF THE INVENTION

1. Field of the Invention

This invention relates generally to electronic calculators, more particularly to a pocket electronic calculator having interchangeable components.

2. Prior Art

Present pocket calculators include, as a minimum, a keyboard, display, display driver electronics, processor or arithmetic electronics, batteries and case. With the exception of those calculators having programming electronics, the only major difference between one type of calculator and another type is that different arithmetic electronics are employed for each. That is, the same or similar type of keyboard, display, display drivers, batteries and case can be employed for all pocket calculators. However, the arithmetic unit of each different type of pocket calculator is different, since different functions are performed by each. Since a pocket calculator has a limited amount of space for keys, the number of functions which can be performed by that calculator are also limited. In order to overcome this problem, each key may be capable of performing more than one function if a shift or prefix key is provided to shift to a different level of arithmetic computation.

When a plurality of functions are assigned to each key of a calculator and shift or prefix keys are employed to change from one function to another function, the arithmetic unit (processing electronics) is relatively large. Any increase in the size of an arithmetic unit decreases the yield of that unit during its manufacture and increases its cost. Furthermore, the multiple functions performed by each key are confusing to a user. One pocket calculator which is presently on the market employs indicia on the top of each key, on the side of the keys, and adjacent each key on the case to indicate the three separate functions which can be performed by that particular key. It can be appreciated that a user may encounter some difficulty in being able to read the indicia associated with each key.

A pocket calculator having a plurality of levels, each corresponding to a different function of each key, may not be desirable for the user, since many of the available functions may not be applicable to his particular needs. However, in order to have some functions available which may be useful to a particular user, he is compelled to purchase a calculator containing other functions which are not applicable to his needs. Furthermore, the needs of a particular user may change from time to time, or additional functions which were previously unavailable may become available in the future in pocket calculators. The user, however, with present calculator configurations cannot avail himself of such additional functions, either as his needs change or as such functions become available, unless he purchases an entirely new and different calculator. That is, it is not now possible for a user to update his pocket calculator with additional functions.

Accordingly, it can be appreciated that a need exists for a pocket calculator which will provide only those functions which are desired by each particular user. A need also exists for a pocket calculator which can be updated with additional functions. Furthermore, a need exists for such a calculator which is relatively inexpensive and uncomplicated.

SUMMARY OF THE INVENTION

It is, therefore, an object of the present invention to provide a pocket calculator which is capable of performing only those arithmetic functions which are applicable to any particular user.

Another object of the present invention is to provide a pocket calculator which is relatively uncomplicated for the user, particularly in changing from one level of arithmetic computation to another level of arithmetic computation.

Still another object of the present invention is to provide a pocket calculator which is relatively inexpensive in comparison to the number of arithmetic functions which can be performed thereby.

A further object of the present invention is to provide a pocket calculator which can be easily and inexpensively updated.

These and other objects of the present invention are attained by a pocket calculator which includes a main frame and a plurality of processor modules which can be employed with the same main frame. More particularly, the main frame includes the basic elements of a pocket calculator, such as keyboard, display, batteries and case. The electronics for the calculator of the present invention are mounted on a separate module which can be interchanged with other such modules.

A feature of the present invention resides in the provision of a plurality of template overlays, each having indicia thereon corresponding to the arithmetic functions of a respective one of the processor modules. Such overlays are disposed for being placed over the keyboard to designate the arithmetic functions of the keys in relation to the particular processor module which is employed.

These and other objects, features and advantages of the present invention, however, will be more fully realized and understood from the following detailed description, when taken in conjunction with the accompanying drawings, wherein:

BRIEF DESCRIPTION OF THE DRAWINGS

FIG. 1 is a view in perspective of a pocket calculator constructed in accordance with the principles of the present invention.

FIG. 2 is a longitudinal sectional view of a portion of a pocket calculator constructed in accordance with the principles of the present invention.

FIG. 3 is a view, partially in section and partially broken away, of the processor module receiving structure of the calculator illustrated in FIG. 2.

FIG. 4 is an elevational view of a processor module.

FIGS. 5 and 6 are plan views of keyboard templates constructed in accordance with the principles of the present invention.

Like reference numerals throughout the various views of the drawings are intended to designate the same or similar elements.

DETAILED DESCRIPTION OF THE PREFERRED EMBODIMENT

With reference to FIG. 1, there is shown a pocket calculator having a keyboard which is generally designated with the reference numeral 10, a display generally designated with the reference numeral 12, and a case 14 for supporting the keyboard 10 and display 12. The keyboard 10 includes a plurality of keys 16, some of which have indicia thereon for designating either arithmetic functions to be performed or numerals. The keys 16 extend through apertures 18 in an upper surface of the case 14. As shown in FIG. 1, indicia are provided on the upper surface of the case 14 adjacent other ones of the keys 16 for indicating arithmetic functions to be performed.

As shown in FIG. 2, the pocket calculator also includes a printed circuit board 20 which is supported on a plurality of posts 22 secured to a lower wall of the case 14. Mounted on the printed circuit board 20 is a connector 24 for receiving a flex circuit (not shown) which extends from the keyboard 10. The keyboard 10 is not shown in FIG. 2.

The display 12 includes a light emitting diode (LED) display unit 26 mounted on a board 28 and an optical filter and cover 30 positioned thereover and mounted on the case 14. The board 28 is mounted on the circuit board 20 and the unit 26 is electrically connected thereto. A display driver unit 32 in the form of an integrated circuit package is mounted on the printed circuit board 20 and includes all of the display driver electronics. A battery (not shown) for supplying power to the calculator is disposed for being received in a space within the case 14 which is designated with the reference numeral 34.

All of the components of the pocket calculator which have been described thus far are old in the art. In the past, it has been the practice to mount an arithmetic unit in the form of an integrated circuit package on the printed circuit board 20 and electrically connected to the keyboard 10 and to the display driver unit 32. The indicia on the upper surface of the case 14 in proximity to certain ones of the keys 16 correspond to arithmetic functions performed by the arithmetic unit of each particular calculator. The structure which has been described thus far, with the exception of the arithmetic unit, will be considered the main frame of the calculator in the following discussion and in the appended claims. The present invention provides a plurality of arithmetic units, each mounted on a separate module, and a plurality of templates each having indicia thereon corresponding to the arithmetic functions performed by a respective one of the arithmetic units, such that the same main frame can be employed for each one of a number of different types of calculator.

As shown in FIGS. 2 and 3, a connector 26 is mounted on a bracket 38 which is secured to an underside surface of the printed circuit board 20. An aperture 40 is provided in the case 14 and the connector 36 is mounted in registry with that aperture 40 to receive a module 42 therein. As shown more clearly in FIG. 4, the module 42 includes a printed circuit board 44 having an arithmetic unit 46 mounted thereon. The arithmetic unit 46 is electrically connected to edge connection leads 48 which are disposed for making electrical contact with appropriate contacting elements in the connector 36. Edges of the board 44 are disposed for being received in notches 50 and 52 of posts 54 and 56, respectively as the module 42 is being inserted into the case 14.

As shown in FIG. 2, a template 58 is disposed for being received on an upper surface of the case 14 and includes a plurality of apertures 60 which are aligned with the apertures 18, such that the keys 16 can be received therethrough. Examples of such templates are illustrated in FIGS. 5 and 6. The case 14 is provided with projections 62 and 64 for receiving the ends of the template 58 thereunder when the template 58 is positioned on the case 14. A knob or projection 66 on the templates 58 permit the template 58 to be removed from the case 14. More particularly, the knob 66 can be gripped by ones finger nails and lifted, such that the ends of the template 58 are withdrawn from the projections 62 and 64.

When it is desired to employ the arithmetic functions shown on the template in FIG. 5, for example, that template is placed over the keyboard 10 on the case 14 and the corresponding arithmetic module is inserted into the aperture 40 and electrically connected to the calculator via the connector 36. A manually actuatable spring clip 68 engages an edge of the board 44 after the module 42 is in position. If different arithmetic functions are desired, the template 58 and module 42 are removed and another template and module are inserted which provide the desired functions. Accordingly, it can be appreciated that the same main frame can be employed for providing a number of different types of calculators.

The invention claimed is:
1. An A portable hand held calculator comprising
   a. a main frame including
      1. a first circuit board,
      2. a keyboard coupled to said first circuit board,
      3. a display coupled to said first circuit board, and
      4. a case for housing and supporting said first circuit board, said keyboard, and said display;
   b. a module including at least an arithmetic unit for receiving information from said keyboard, processing said keyboard information, and supplying information to said display;
   c. means for releasably attaching and electrically connecting said module to said main frame; and
   d. a template disposed for being received on said keyboard and having indicia thereon related to the arithmetic functions performed by said arithmetic unit.

2. The calculator of claim 1, wherein said case includes an aperture for receiving said module therein.

3. The calculator of claim 1, wherein said module includes a second printed circuit board having said arithmetic unit mounted thereon; and said attaching means includes an electrical connector having two mating parts, one of which is mounted on said first printed circuit board and the other of which is mounted on said second printed circuit board.

4. The calculator of claim 3, further comprising a display driver unit mounted on said first printed circuit board.

5. The calculator of claim 4, wherein said keyboard and said display are electrically connected to said first printed circuit board.

6. The calculator of claim 1, further comprising manually actuatable means for locking said module to said main frame.

* * * * *